(12) United States Patent
Ballou (10) Patent No.: US 9,772,403 B2
(45) Date of Patent: Sep. 26, 2017

(54) VEHICLE POSITION VALIDATION

(71) Applicant: The Boeing Company, Chicago, IL (US)

(72) Inventor: Philip J. Ballou, Alameda, CA (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 13/974,657

(22) Filed: Aug. 23, 2013

(65) Prior Publication Data

US 2015/0054674 A1    Feb. 26, 2015

(51) Int. Cl.
*G01S 13/93* (2006.01)
*G01C 21/00* (2006.01)
*G01S 7/22* (2006.01)
*G01S 7/12* (2006.01)
*G01S 7/24* (2006.01)
*G01S 19/39* (2010.01)
*G01S 5/02* (2010.01)

(52) U.S. Cl.
CPC ........ *G01S 13/9307* (2013.01); *G01C 21/005* (2013.01); *G01S 5/0205* (2013.01); *G01S 7/12* (2013.01); *G01S 7/22* (2013.01); *G01S 7/24* (2013.01); *G01S 19/39* (2013.01)

(58) Field of Classification Search
CPC ... G01S 13/865; G01S 5/0072; G01S 13/9307
USPC .............. 342/41, 357.2, 357.23, 357.25
See application file for complete search history.

(56) References Cited

U.S. PATENT DOCUMENTS

| | | | | |
|---|---|---|---|---|
| 4,428,057 A | * | 1/1984 | Setliff | G01C 21/20 342/451 |
| 4,590,569 A | * | 5/1986 | Rogoff | G01C 21/22 340/990 |
| 6,687,637 B2 | * | 2/2004 | Garabedian | G05B 9/02 342/41 |
| 7,859,449 B1 | * | 12/2010 | Woodell | G01S 13/94 342/26 B |
| 8,154,438 B1 | * | 4/2012 | Larson | G01S 5/16 342/118 |
| 2002/0183071 A1 | * | 12/2002 | Shioda | G01S 5/021 455/456.1 |

(Continued)

FOREIGN PATENT DOCUMENTS

WO    WO 00/02009    1/2009

OTHER PUBLICATIONS

Gilles, E.D., Faul, M. Kabatek, U. & Sandler M. , "Automation of the Traffic on Waterways", *Automatisierungstechnische Praxis*, 35 (10), pp. 543-552, Oct. 1, 1993.

(Continued)

*Primary Examiner* — Marcus Windrich
(74) *Attorney, Agent, or Firm* — Miller, Matthias & Hull LLP (57) ABSTRACT

Methods and computer-readable media are described herein for providing an automated validation of vehicle positioning and corresponding error notification. According to various aspects, a first position of a vehicle may be determined using a first positioning system. A second position of the vehicle may be determined using a second positioning system. An offset between the first and second positions of the vehicle may be determined. If the offset exceeds a threshold offset, a notification may be provided to indicate a potential error in the position of the vehicle.

20 Claims, 8 Drawing Sheets

(56) References Cited

U.S. PATENT DOCUMENTS

| | | | |
|---|---|---|---|
| 2003/0112171 A1* | 6/2003 | Michaelson | B63B 43/18 342/41 |
| 2011/0084870 A1* | 4/2011 | Kondo | B63B 49/00 342/41 |
| 2011/0140950 A1* | 6/2011 | Andersson | G01S 5/0072 342/32 |
| 2011/0163908 A1* | 7/2011 | Andersson | G01S 5/0072 342/36 |
| 2011/0316743 A1* | 12/2011 | Chantz | G01S 5/04 342/367 |
| 2014/0292571 A1* | 10/2014 | Bardout | G01S 19/215 342/357.51 |

OTHER PUBLICATIONS

Extended European Search Report dated Nov. 21, 2014 from EP Application Serial No. 14171200.0.
http://www.nautinst.org/en/forums/ecdis/ecdis-issues--enc.cfm/E10crosscheck, dated Aug. 22, 2013.
http://www.transas.com/products/onboard/ns/navi-radar, dated Aug. 22, 2013.

* cited by examiner

VEHICLE POSITION VALIDATION

BACKGROUND

Ships and other vehicles often utilize various types of positioning systems and technologies to safely navigate between locations. For example, ship crews may employ an electronic chart, such as an electronic chart display and information system (ECDIS), and global positioning system (GPS) to provide a dynamic, real-time visualization of the geographical features of the surrounding environment and the precise position of the ship within that environment. As the ship moves through an area, the ECDIS provides a visualization of the ship's location with respect to the fixed objects, land, and other features around the ship that could present a navigational hazard.

However, limitations of GPS technology introduce errors that may result in the inaccurate positioning of the ship on the ECDIS. In other words, the displayed position of the ship on the electronic chart utilized by the crew may not be accurate due to GPS errors. If relied upon as the sole means of navigation, an inaccurate representation of the ship's position due to a GPS error could result in the ship running aground or coming into contact with a fixed object. To account for the potential for errors, a crew member must manually confirm the ship's positioning via another navigational tool in order to ensure that the position of the ship on the electronic chart is accurate. Doing so takes time and attention away from other duties. Inattentive seamanship due to overly optimistic reliance on technology could result in an accident, close call, or navigational error as the ship may be positioned at a location that is substantially different from the position indicated on the electronic chart.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods and computer-readable media are described herein for providing an automated validation of vehicle or other element positioning and corresponding error notification. According to embodiments presented herein, a first position of a vehicle may be determined using a first positioning system. A second position of the vehicle may be determined using a second positioning system. A position validation computer may determine an offset between the first and second positions, and if the offset exceeds a threshold offset, may provide a notification to indicate a potential error in the position of the vehicle.

According to another aspect, a computer-implemented method for validating a position of a vehicle may include determining a first position of an element with respect to a first position of the vehicle using a first positioning system. Representations of the element and of the vehicle may be provided at their respective positions on a first image. A second position of the element with respect to a second position of the vehicle may be determined using a second positioning system. Representations of the element and of the vehicle may be provided at their respective second positions on a second image. The two images may be aligned such that the first position of the element aligns with the second position of the element. An offset between the first and second positions of the vehicle may be determined, and if the offset exceeds a threshold offset, a notification may be provided.

According to yet another aspect, a first position of a ship may be determined using a GPS and plotted on an electronic chart. A second position of the ship may be determined using a second positioning system. An offset between the first position and the second position may be determined. If the offset exceeds a threshold offset, then a notification may be provided to indicate a potential error in the position of the ship.

The features, functions, and advantages discussed herein can be achieved independently in various embodiments of the present disclosure or may be combined in yet other embodiments, further details of which can be seen with reference to the following description and drawings.

DETAILED DESCRIPTION

The following detailed description is directed to methods, computer-readable storage media, and other suitable technologies for providing an automated validation of vehicle positioning and corresponding error notification. It should be appreciated that for clarity purposes, concepts disclosed herein will be described in the context of a ship, and the confirmation of the geographic location or position of the ship at any given time. Although the concepts will be described in the context of a ship, the concepts and technologies described herein are applicable to any vehicle, land, sea, or air. Consequently, a "vehicle" as described herein and as recited in the accompanying claims, may include, but is not limited to, a ship, boat, submersible, aircraft, dirigible, land-based vehicle or craft, spacecraft, or any transportation apparatus that is capable of utilizing any number of positioning systems to establish its geographic location.

As discussed briefly above, ship crews often utilize an electronic chart for navigational purposes. The electronic chart typically plots a representation of the ship's position according to GPS data, along with surrounding environmental features such as the location of nearby land, fixed objects such as buoys, underwater hazards such as reefs or shallow areas, as well as nearby ships and other moving objects whose positions are known. Typical electronic charts, just like conventional paper-based charts, are very accurate, providing the precise geographic location of all potential hazards. However, when operating in restricted waters such as coastal areas, ports, harbors, fjords, bays, deltas, and rivers, a ship's captain relies on the accurate positioning of the ship on the electronic chart for safe navigation.

When working properly, GPS is very accurate. Ships and other vehicles utilize GPS technology to determine the location of the ship within a very small margin of error. However, equipment failures in a GPS satellite and/or a shipboard receiver, incorrect calibrations in the GPS satellite, GPS receiving equipment, or the ECDIS, among other reasons, may result in the incorrect positioning of the ship by an offset distance that can be significant. If unnoticed, such offsets may lead the captain or crew to believe that the ship is in a different location than it actually is, and could cause them to inadvertently run the ship aground or into submerged hazards.

According to the concepts and technologies described herein, a position validation computer electronically compares a position of the ship obtained via GPS or other positioning system, to a ship position obtained by an independent positioning system. If the two ship positions are offset by a threshold distance, a visual and/or audible notification is provided to the captain or crew. As a result, the crew is able to devote time to other duties without concern for errors in the plotted position of the ship or for performing manual validation.

Figure 1:
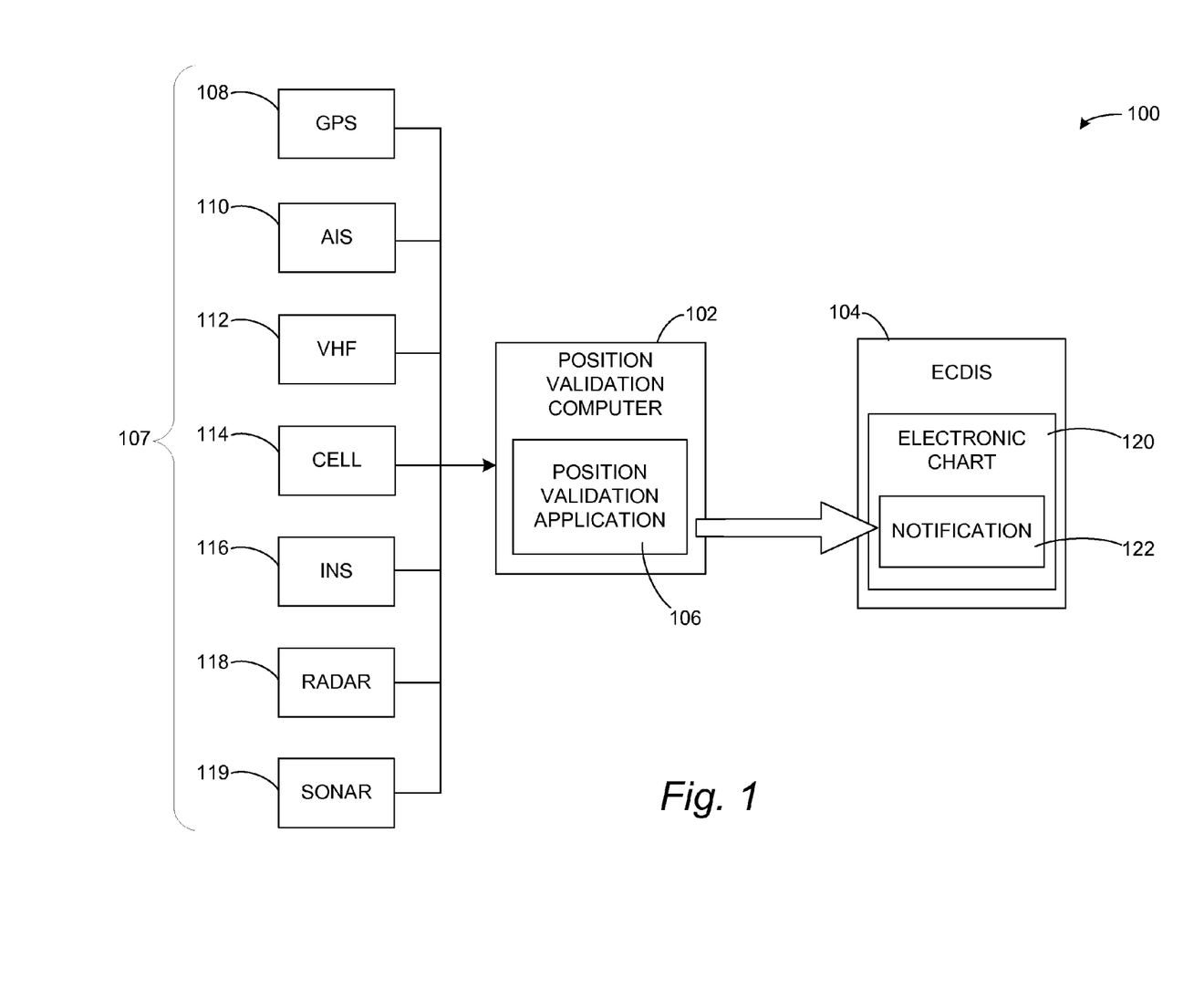
FIG. 1 is a block diagram of a position validation system according to various embodiments presented herein.

In the following detailed description, references are made to the accompanying drawings that form a part hereof and that show, by way of illustration, specific embodiments, or examples. In referring to the drawings, like numerals represent like elements throughout the several figures. FIG. 1 is a block diagram of a position validation system 100 according to embodiments described herein. FIG. 1 will be used to introduce the components of the position validation system 100. A detailed explanation and example embodiments will then be discussed with respect to FIGS. 2-6.

According to various embodiments, the position validation system 100 includes a position validation computer 102 and an ECDIS 104. It should be appreciated that in some implementations, the position validation computer 102 may be incorporated into the ECDIS 104 or vice versa. For clarity, the position validation computer 102 and ECDIS will be described as separate components that may communicate directly or via a network (not shown here).

The position validation computer 102 may store and execute a position validation application 106 that is operative to validate the position of the ship per the embodiments disclosed herein. Further components of the position validation computer 102 will be described in greater detail below with respect to FIG. 7. According to various embodiments, the position validation computer 102 receives position data from any type and number of positioning systems 107. The ship's position is plotted within the surrounding environment corresponding to at least two positioning systems 107, and the images are scaled, overlaid, and aligned to determine if an offset exists that exceeds a predetermined threshold. If the threshold offset is exceeded, then the position validation application provides a visual and/or audible notification 122 on or in conjunction with the electronic chart 120 of the ECDIS 104. It should be appreciated that the notification 122 may be provided from the ECDIS 104 or elsewhere, including from a separate component. Also, the nature and method of notification 122 may vary to reflect the level of urgency and the amount the threshold is exceeded.

The position validation computer 102 may utilize position data from any type of positioning systems 107. Examples of positioning systems 107 include, but are not limited to, GPS 108, automatic identification system (AIS) 110, very high frequency (VHF) direction finder 112, shore-based cellular phone towers 114, inertial navigation system (INS) 116, radar 118, and sonar 119. According to various embodiments, the position validation computer 102 executing the position validation application 106 will utilize at least two positioning systems 107. Because the ECDIS 104 of many conventional ships utilize GPS 108 for determining the position of the ship and plotting that position accordingly on the electronic chart 120, this disclosure will describe the GPS 108 as the first positioning system 107 for which a second positioning system 107 will be used for position validation. It should be appreciated, however, that any two or more positioning systems 107 may be used by the position validation application 107 in validating the position of the ship. Each positioning system will be described further below.

Figure 2:
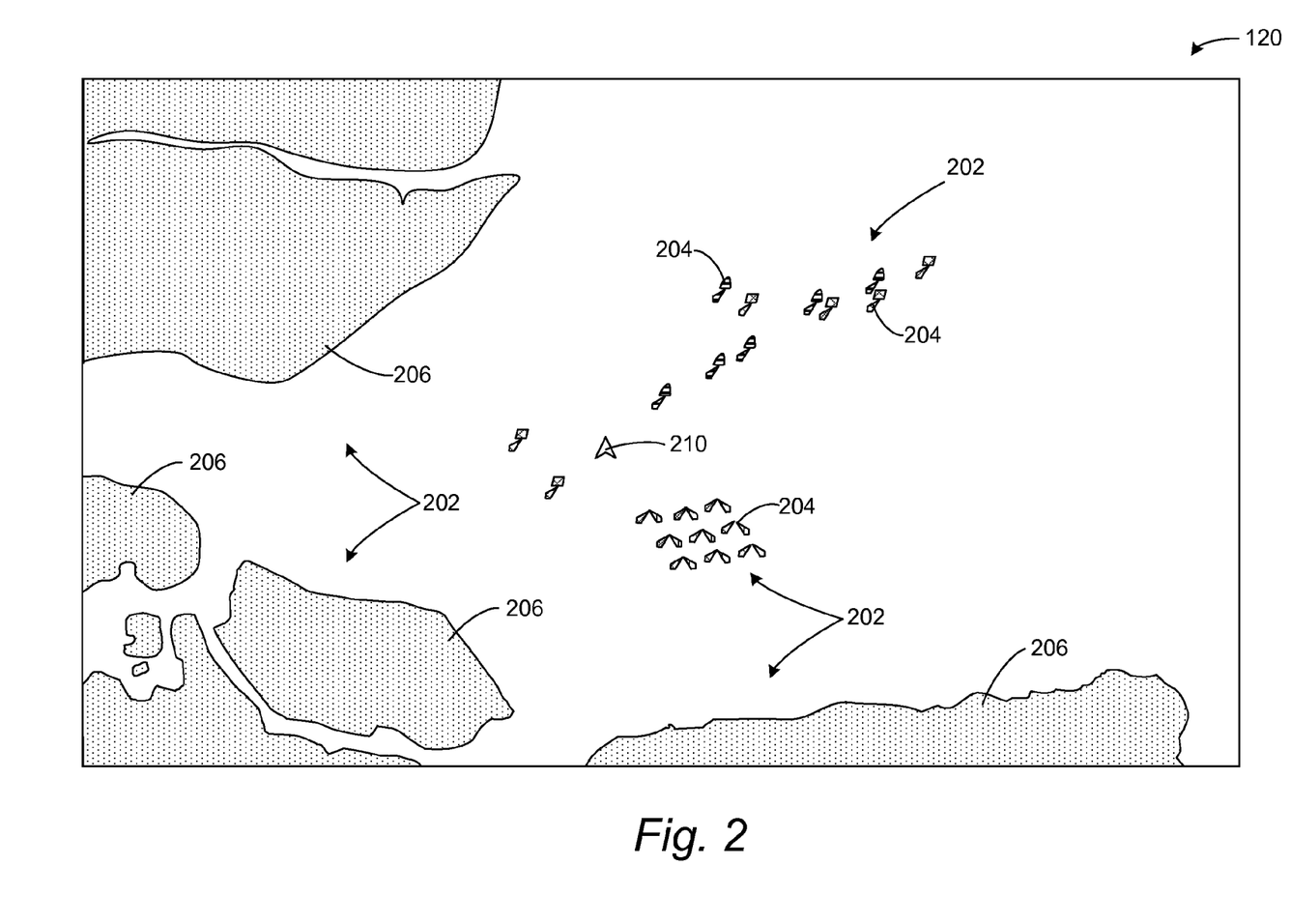
FIG. 2 is a top view of an electronic chart showing an illustrative representation of the position of a ship according to a GPS or other positioning system, as well as the positions of surrounding land and other objects, according to various embodiments presented herein.

Turning now to FIG. 2, an example of an electronic chart 120 of an ECDIS 104 will be described. The electronic chart 120 shown and described here will be used in FIGS. 4-5B to illustrate an example of the validation process according to one embodiment. The electronic chart 120 shown in FIG. 2 includes a number of environmental elements 202. As used herein, an "environmental element" may include any type of object, land, vehicle, or feature, man-made or natural, that may be plotted on an electronic chart 120 and may be of interest to the captain or crew of a ship in the area. For clarity purposes, two types of environmental elements 202 are shown here, objects 204 and land 206.

The objects 204 may include buoys, channel markers, or any other type of objects that may be of a navigational interest to the crew of the ship. Various types of symbols and identification patterns on those symbols are shown, but are not relevant to this discussion. It should be understood that conventional electronic charts 120 may be very complex, depicting large quantities of information using various and often numerous symbols, shapes, colors, patterns, and graphics. The objects 204 have been simplified in this example in both type and quantity for clarity purposes. The land 206 may include rocks, soil, sand, reef, or any type of land that is exposed or submerged at a depth that may be a hazard to the ship.

The electronic chart 120 plots a ship indicator 210 at the position of the ship according to current or recent GPS data. As previously discussed, GPS is typically used by the ECDIS 104 to determine and plot the position of the ship indicator 210 on the electronic chart 120, although any positioning system 107 may be used. As seen in this example, due to the proximity of the ship with the land 206 and numerous objects 204, the accuracy of the position of the ship indicator 210 is paramount to the captain and crew of the ship. As the ship navigates close to shore or through potentially hazardous areas such as these, the crew's attention may be diverted while maneuvering the ship or communicating with other traffic. However, it is during times such as these that validating the ship's GPS position should be a high priority due to the impact of any error. Because manual confirmation of the GPS position is time consuming, it may not be possible or practical, leading to an increased risk for error and for corresponding mishap.

Figure 3:
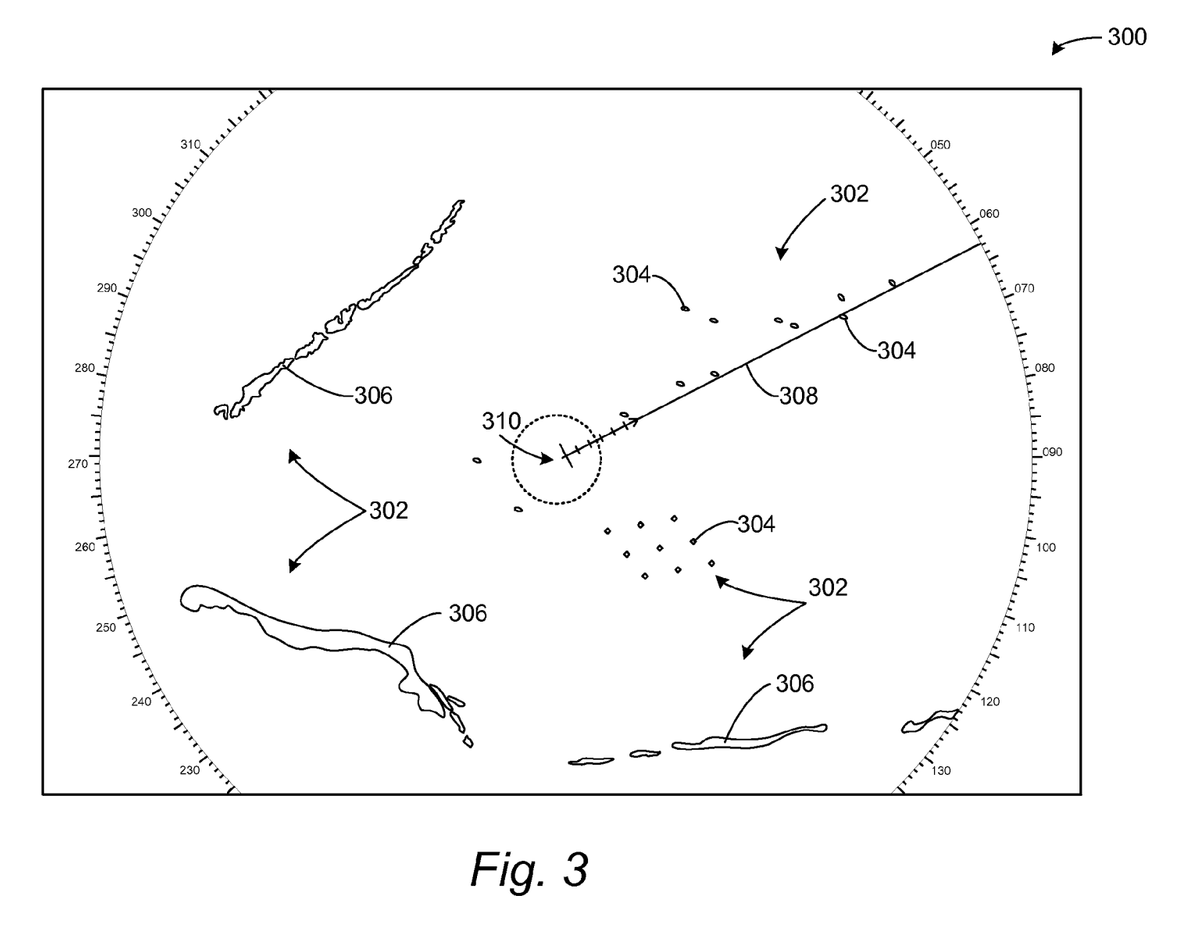
FIG. 3 is a top view of an illustrative radar image originating from the ship of FIG. 2, showing radar reflections of the land and other objects surrounding the ship, according to various embodiments presented herein.
Figure 4:
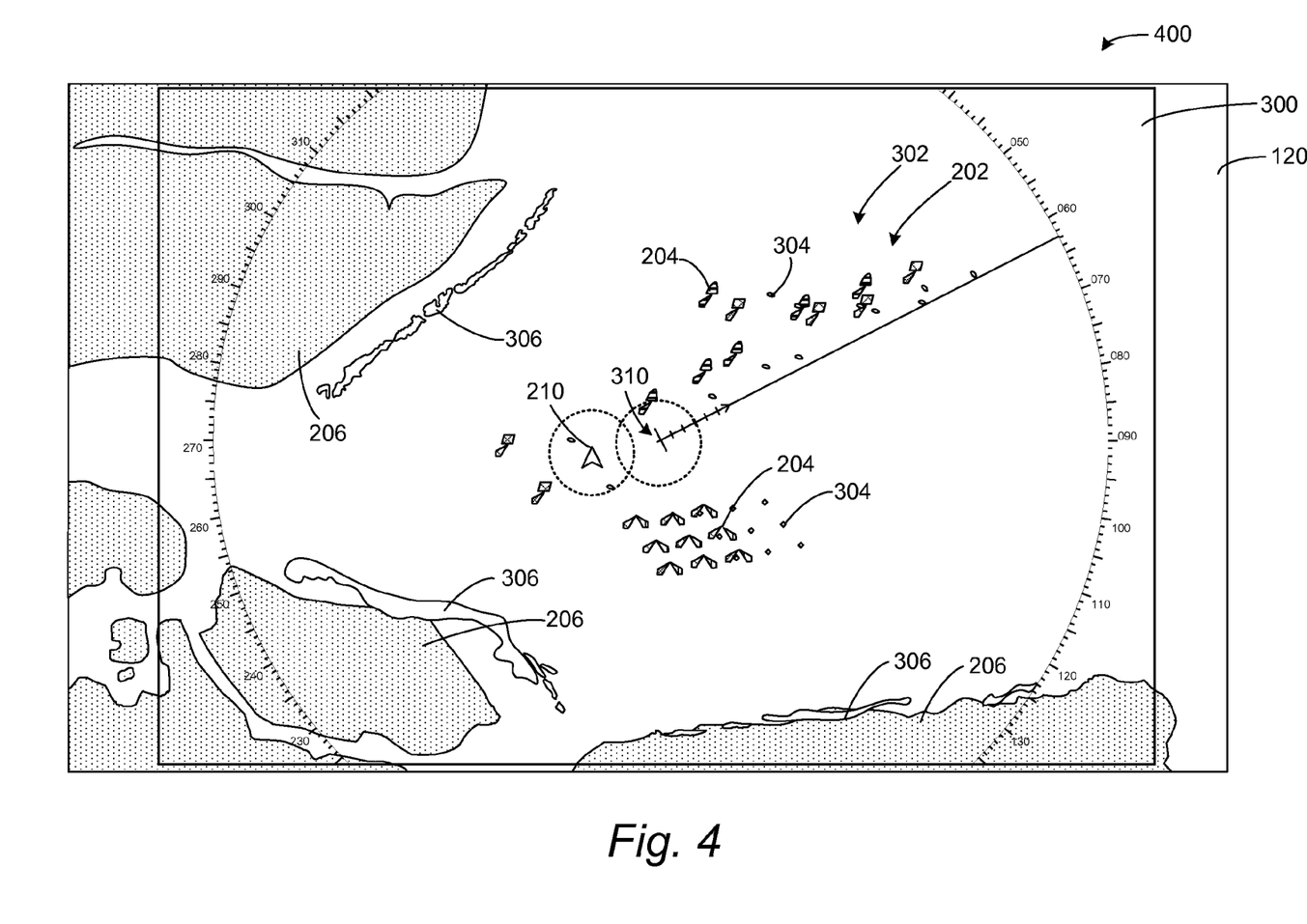
FIG. 4 is a top view of the electronic chart of FIG. 2 with the radar image of FIG. 3 overlaid but unaligned, according to various embodiments presented herein.

FIG. 3 shows an example of a radar image 300 captured from the ship of FIG. 2. Radar 118 is a positioning system 107 that may be used by the position validation application 106 to validate the position of the ship. Radar 118 is a well-known system in which a ship-based radar antenna or transmitter transmits radio waves and receives and interprets the energy reflected back by surrounding objects to create the radar image 300 that visually represents the surrounding environment. The radar image 300 shows a number of environmental element reflections 302. In this example, the environmental element reflections 302 correspond to the environmental elements 202 shown and described above with respect to FIG. 2. The environmental element reflections 302 include object reflections 304 and land reflections 306 corresponding to the objects 204 and land 206. The center of the radar image 300 represents the ship radar indicator 310, which is the location of the radar transmitter, and consequently, the location of the ship. For clarity purposes, the location of the ship has been encircled with a broken line.

In order to validate the GPS position of the ship as represented on the electronic chart 120 by the ship indicator 210, the position validation application 106 of this embodiment utilizes the radar image 300. Looking at FIG. 4, after properly scaling the radar image 300 to match the scale of the electronic chart 120, the position validation application 106 overlays the radar image 300 on the electronic chart 120 to create an image overlay 400. In the image overlay 400, the radar image 300 and the electronic chart 120 are both visible, but not yet aligned. In order to validate the position of the ship, the environmental element reflections 302 must be substantially aligned with the corresponding environmental elements 202. As seen here, the land reflections 306 represent the leading edge of the land 206, but do not yet align with the representations of the land 206. Similarly, the dots that represent the object reflections 304 do not yet align with the objects 204 represented on the electronic chart 120. For at least the reason that the images are not yet aligned, the ship indicator 210 does not align with the ship radar indicator 310.

Figure 5A:
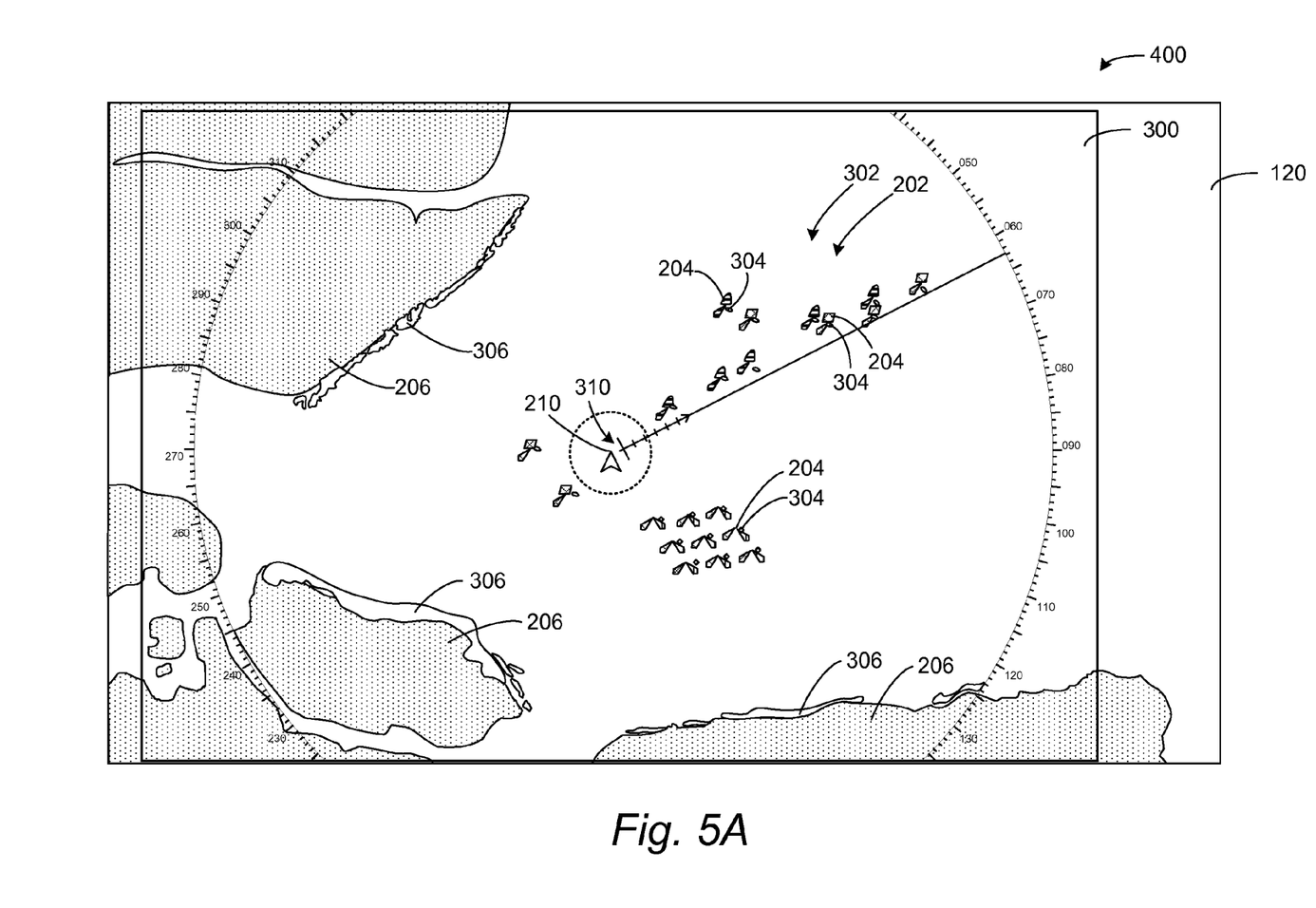
FIG. 5A is a top view of the radar image of FIG. 3 overlaid and aligned with the electronic chart of FIG. 2, illustrating confirmation of ship position according to various embodiments presented herein.

After creating the image overlay 400, the position validation application 106 aligns the environmental element reflections 302 with the corresponding environmental elements 202 in order to properly align the images, as seen in FIG. 5A. The image overlay 400 of FIG. 5A shows the result of the alignment of the radar image 300 with the electronic chart 120 such that the environmental element reflections 302 align with the corresponding environmental elements 202. As seen, the object reflections 304 substantially align with the objects 204, while the land reflections 306 substantially align with the edge of the land 206 where the land and water meet. In aligning the images to create the image overlay 400, the position validation application may analyze the electronic chart 120 image and the radar image 300 to detect edges, colors, symbols, and like features using known technology.

Once the images are properly aligned, the position validation application 106 may compare the indicated positions of the ship to determine if any offset exists. For example, looking at FIG. 5A, the broken circle highlights the ship indicator 210 that represents the position of the ship according to GPS 108, as well as the ship radar indicator 310 that represents the position of the ship according to radar 118. Because the ship indicator 210 and ship radar indicator 310 are located at substantially the same geographic location, the position validation application 106 may conclude that the ship's position as indicated by the ship indicator 210 is correct and take no further immediate action.

Figure 5B:
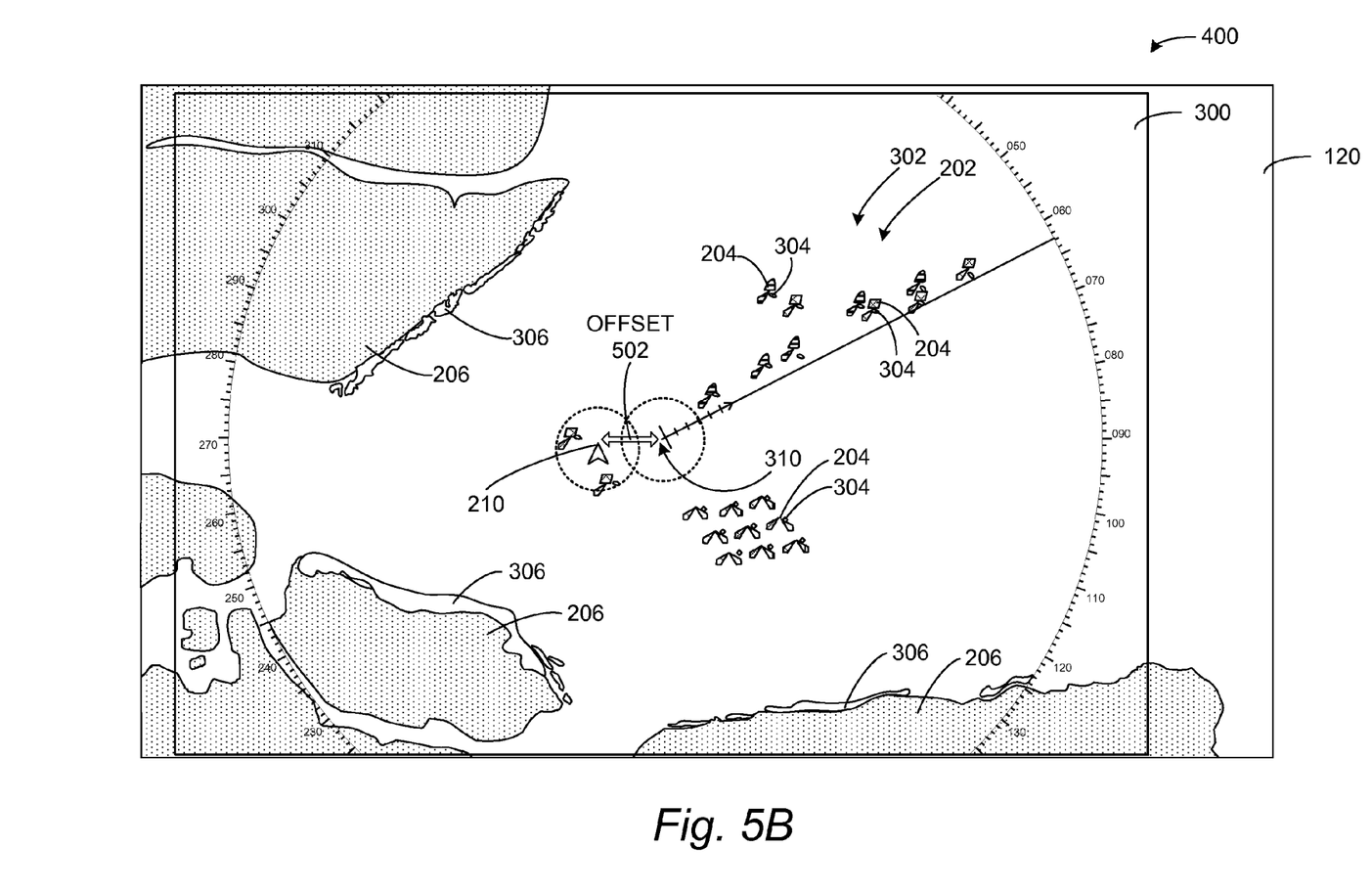
FIG. 5B is a top view of the radar image of FIG. 3 overlaid and aligned with the electronic chart of FIG. 2, illustrating an offset in ship position, indicating an error according to various embodiments presented herein.

In contrast, FIG. 5B illustrates the image overlay 400 of the radar image 300 and electronic chart 120 that, when properly aligned such that the environmental element reflections 302 align with the corresponding environmental elements 202, illustrates an offset 502 between the ship indicator 210 and the ship radar indicator 310. The position validation application 106 determines what the offset 502 in any predetermined format, including but not limited to a specific distance directly between the two positions, an x-axis or y-axis component of the separation between the two positions, or a depth discrepancy if operating in a three-dimensional environment such as with a submarine. After determining the offset 502, the position validation application 106 compares the offset 502 to a predetermined threshold offset in order to determine whether or not a notification 122 is to be provided.

For example, if the offset 502 of FIG. 5B is approximately 500 meters and the threshold offset for that particular geographic area or operating condition is 100 meters, then the position validation application 106 provides a notification 122 to the captain or crew. The notification may be audible, visual, tactile (vibrations), or a combination thereof. As an example, the ship indicator 210 on the electronic chart 120 may turn red and flash, while text simultaneously appears at a location on the electronic chart 120 that indicates a potential position discrepancy. The position validation application 106 may also, automatically or in response to a manual request, provide the image overlay 400 to show the radar image 300 and offset 502 to the captain. The captain may then determine a course of action, which may include further validation with a third positioning system 107. If a notification 122 is not acknowledged within a specified period of time, its urgency may increase both visually and audibly.

The threshold offset may be set or predetermined according to standard minimums used by a particular regulatory agency, industry, company, or crew to be used uniformly in all situations and environments. According to an alternative embodiment, the threshold offset may change or be customized according to any criteria, including but not limited to, the particular geographic area, vehicle operating parameters, time of day, weather conditions, or mission. For example, the threshold offset may decrease as the speed of the ship increases in order to provide the crew with more time to slow or alter course should even a minor positioning error be determined. Similar decreases in the threshold offset may be desired if the visibility decreases due to darkness or weather conditions. In geographic areas with many potential hazards in which accurate positioning is paramount, the threshold offset may be minimized to ensure that any positioning errors are discovered and corrected early. Similarly, in open unrestricted areas with no nearby hazards, the threshold may be increased, for example, to decrease the likelihood of unnecessary notifications 122.

When radar 118 is not available, any other positioning system 107 may be used by the position validation application 106. Similarly, other positioning systems 107 may be utilized as the first positioning system used to plot the ship indicator 210 on the electronic chart 120, rather than GPS 108. Various examples will now be described to illustrate the use of the positioning systems 107 shown in FIG. 1.

According to one example, AIS 110 technology may be used to plot the position of a nearby ship ("traffic"). In doing so, AIS transmissions from the traffic are received at the ship and converted to ASCII and parsed. The traffic identification, GPS position, course over ground, true bearing, and other information may be included in the AIS transmissions. The converted data may be used to plot the position of the traffic on the electronic chart 120 per known techniques.

Radar 118 may then be used as a second positioning system for validation purposes. A radar image 300 is created and overlaid on the electronic chart 120 as described above with respect to FIGS. 3-5B. In aligning the radar image 300 with the electronic chart 120, the position validation application 106 aligns the radar reflection of the traffic with the plotted representation of the traffic on the electronic chart. As described above with respect to FIG. 5B, the position validation application 106 may then determine the offset 502 between the ship radar indicator 310 and the ship indicator 210 (determined using GPS 108 or other positioning system 107) and determine if a threshold offset has been exceeded. It should be appreciated that AIS broadcasts from numerous traffic ships and fixed objects may be used to plot corresponding representations on the electronic chart 120, which provide for numerous environmental elements 202 against which corresponding environmental element reflections 302 may be aligned prior to determining the offset 502. It should also be appreciated that AIS information may be used to look up detailed information regarding the broadcasting vessel. In doing so, a graphic representation of the vessel (vector or pixel) may be constructed and plotted at the determined location on the electronic chart 120. The radar reflection of the vessel may be used to compare the radar image size of the vessel with the graphic representation based on AIS information to confirm match and alignment of the radar and electronic chart representations.

Another positioning system 107 includes a VHF direction finder 112. VHF transmissions may be used for direction finding, such as with VHF omnidirectional radio range (VOR) systems. Using VOR technologies, the position validation application 106 may determine the position of the ship. This location may be superimposed onto the electronic chart 120 for determination of the offset 502 with respect to the ship indicator 210 positioned according to a location determination made using GPS 108 or other positioning system 107. Similarly, the position validation application 106 may utilize triangulation techniques and signals from shore-based cellular phone towers 114 to determine the position of the ship. Data from an INS 116 may also be used for position determination and validation based on dead reckoning and associated navigational tools coupled with a prior validated ship position.

It should be understood from the examples provided herein that any position determination techniques and technology may be used to determine the position of the ship using at least two different positioning systems 107. These positions may then be separately plotted, scaled to match one another, overlaid, aligned, and compared to determine the offset 502. The offset is compared to a threshold offset, which if exceeded, results in a notification 122 provided to the captain or crew. The notification may be visual, audible, tactile, or a combination thereof. Additionally, according to one embodiment, a notification 122 that the validation process has been performed and a threshold offset has not been exceeded may be provided to ensure the captain or crew that validation is ongoing and the indicated ship's position is accurate.

According to various embodiments, this validation process occurs automatically in the background, providing and validating an accurate representation of the position of the ship on the electronic chart 120, with notifications 122 provided if a threshold offset is exceeded. Because the overlay of the radar image 300 and electronic chart 120 occurs in the background without being displayed on the ECDIS 104, clutter on the electronic chart is reduced. If a threshold offset is exceeded, or if desired at any time by the captain or crew, the overlay of the images may be visualized on the ECDIS 104.

The concepts described herein may not only be used to validate the position of a ship, but also to validate the position of any object within the environment surround the ship. For example, a traffic ship's position may be validated using AIS 110 information from the traffic, as well as radar 118 from the ship doing the validating (primary ship). The difference from this scenario and the example described above in which the position of the primary ship was being validated using AIS 110 and radar 118 information is that during alignment, the position validation application 106 aligns the radar image 300 and electronic chart 120 using the primary ship's position, as well as those of other environmental elements 202. The offset 502 is then calculated with respect to the traffic ship to determine if the positions of the traffic ship with respect to the AIS information and the radar reflection are accurate. Essentially, according to various embodiments, the position validation application 106 may align images according to the "best fit" of the majority of environmental elements 202 and corresponding environmental element reflections 302, and provide notifications 122 regarding any offsets 502 that exceed an applicable threshold. In this manner, the captain or crew may be provided with up-to-date information regarding any position anomalies corresponding to the ship itself, or any surrounding elements.

Figure 6:
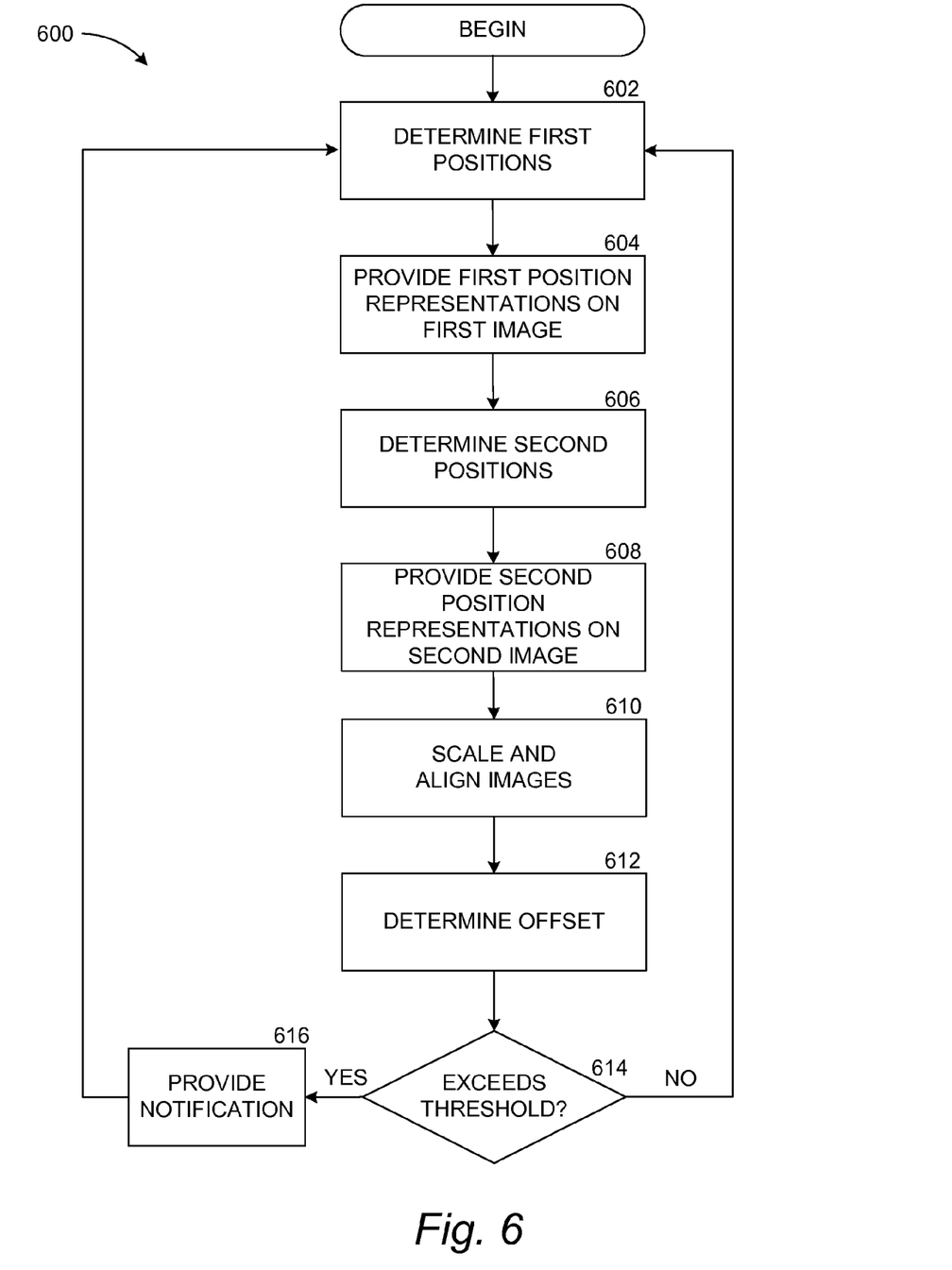
FIG. 6 is a flow diagram illustrating a method for validating vehicle position, in accordance with the embodiments presented herein.

Referring now to FIG. 6, additional details will be provided regarding embodiments presented herein for providing an automated validation of vehicle positioning. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 6 shows a routine 600 for validating vehicle positioning and providing appropriate error notification. In some embodiments, the routine 600 may be performed by the position validation application 106, including or in combination with the ECDIS 104. The routine 600 begins at operation 602, where the position validation application 106 determines a first position of the ship according to a first positioning system 107. According to examples described above, this first positioning system may include GPS 108. As described above, according to alternative embodiments in which the position of an element surrounding the ship is to be validated, the first position determined at operation 602 may be the position of the traffic ship or other object or environmental element 202.

From operation 602, the routine 600 continues to operation 604, where the position validation application 106 provides the first position of the ship and any appropriate environmental elements 202 on a first image. From the examples provided above, this operation may include providing the ship indicator 210 on the electronic chart 120, which includes the representations of the environmental elements 202. The routine 600 continues to operation 606, where the position validation application 106 determines a second position of the ship according to a second positioning system 107. As an example, the second position of the ship may be at the ship radar indicator 310 located at the center of the radar image 300 created via radar 118. When validating the position of an element surrounding the ship, this second position may be the position of an environmental element reflection 302 or traffic reflection with respect to the position of the ship at the center of the radar image 300.

From operation 606, the routine 600 continues to operation 608, where the position validation application 106 provides the second position of the ship and any appropriate environmental elements 202 on a second image. Continuing with the examples provided above, this operation may include providing the radar image 300 having the ship radar indicator 310 and appropriate environmental element reflections 302. The routine 600 continues to operation 610, where the position validation application 106 scales and aligns the images, such as scaling and aligning the radar image 300 over the electronic chart 120 with the representations of the environmental elements 202 aligning with the environmental element reflections 302.

At operation 612, the offset 502 with respect to the positions of the ship or with respect to an applicable environmental element 202 is determined, and at operation 614, the position validation application 106 determines if the offset 502 exceeds a threshold offset. If the threshold offset is exceeded, then the routine 600 proceeds to operation 616, where a notification 122 is provided via the ECDIS 104 or other desired means. The routine 600 then returns to operation 602 and proceeds as described above. It should be appreciated that the routine 600, or the return to operation 602 and repeat of the routine 600, may be initiated by any predetermined or customized trigger, including but not limited to, a programmed time interval, a location of the ship, operating parameter of the ship, manual initiation, or a combination thereof. Returning to operation 614, if the position validation application 106 determines that the offset 502 does not exceed a threshold offset, then the routine returns to operation 602 and proceeds as described above.

Figure 7:
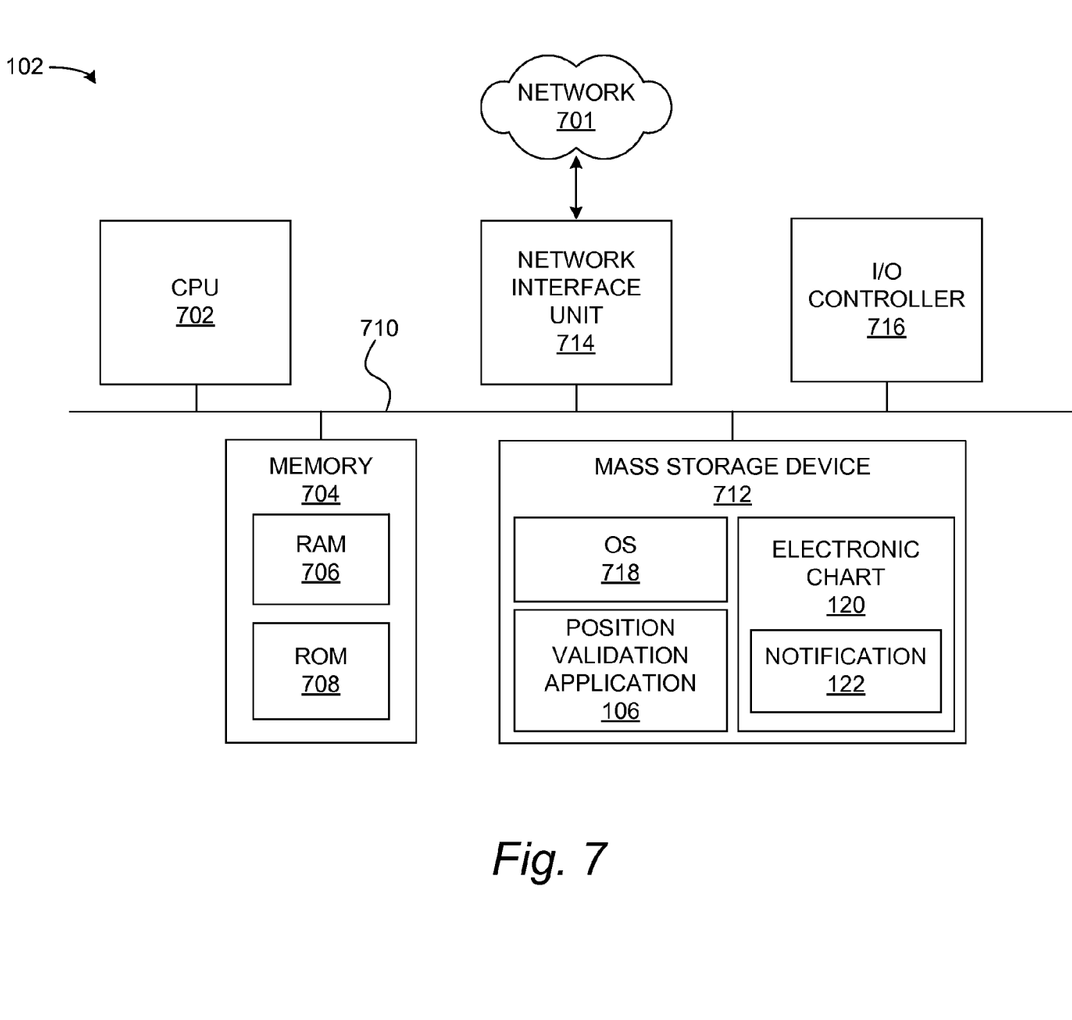
FIG. 7 is a block diagram showing an illustrative computer hardware and software architecture for a computing system capable of implementing aspects of the embodiments presented herein.

FIG. 7 shows an illustrative position validation computer 102 capable of executing the software elements described herein for providing validation of a vehicle position. The position validation computer 102 may be embodied in single computing device or in a combination of one or more processing units, storage units, and/or other computing devices. As described above, the position validation computer 102 may include the ECDIS 104, or may operate in combination with the ECDIS 104. The position validation computer 102 includes one or more central processing units 702 ("CPUs"), a system memory 704, including a random access memory 706 ("RAM") and a read-only memory 708 ("ROM"), and a system bus 710 that couples the memory to the CPUs 702.

The CPUs 702 may be standard programmable processors that perform arithmetic and logical operations necessary for the operation of the position validation computer 102. The CPUs 702 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The position validation computer 102 also includes a mass storage device 712. The mass storage device 712 may be connected to the CPUs 702 through a mass storage controller (not shown) further connected to the bus 710. The mass storage device 712 and its associated computer-readable media provide non-volatile, non-transitory storage for the position validation computer 102. The mass storage device 712 may store an operating system 718, as well as specific application modules or other program modules, such as the position validation application 106, described above. The mass storage device 712 may also store data collected or utilized by the various systems and modules, such as the electronic chart 120 and notifications 122 described above.

The position validation computer 102 may store programs and data on the mass storage device 712 by transforming the physical state of the mass storage device to reflect the information being stored. The specific transformation of physical state may depend on various factors, in different implementations of this disclosure. Examples of such factors may include, but are not limited to, the technology used to implement the mass storage device 712, whether the mass storage device is characterized as primary or secondary storage, and the like. For example, the position validation computer 102 may store information to the mass storage device 712 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete element in a solid-state storage device. Other transformations of physical media are possible without departing from the scope and spirit of the present description, with the foregoing examples provided only to facilitate this description. The position validation computer 102 may further read information from the mass storage device 712 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer media that can be accessed by the position validation computer 102. Computer-readable media includes communication media, such as signals, and computer-readable storage media. By way of example, and not limitation, computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the position validation computer 102. According to one embodiment, the position validation computer 102 may have access to computer-readable storage media storing computer-executable instructions that, when executed by the computer, perform the routine 600 for providing an automated cross-check of vehicle positioning and corresponding error notification, as described above in regard to FIG. 6.

According to various embodiments, the position validation computer 102 may operate in a networked environment using logical connections to remote computers through a network, such as the network 701. The position validation computer 102 may connect to the network 701 through a network interface unit 806 connected to the bus 710. It should be appreciated that the network interface unit 806 may also be utilized to connect to other types of networks and remote computer systems. The position validation computer 102 may also include an input/output controller 716 for providing output to a display device, such as an ECDIS 104, computer monitor, a printer, or other type of output device. The input/output controller 716 may further receive input from devices, such as a keyboard, mouse, electronic stylus, touch screen, and the like. It will be further appreciated that the position validation computer 102 may not include all of the elements shown in FIG. 7, may include other elements that are not explicitly shown in FIG. 7, or may utilize an architecture completely different than that shown in FIG. 7.

Based on the foregoing, it should be appreciated that technologies for providing an automated cross-check of vehicle positioning and corresponding error notification are disclosed herein. Although the subject matter presented herein has been described in language specific to computer structural features, methodological acts, and computer-readable media, it is to be understood that the disclosure defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for validating a position of a vehicle, the method comprising:
   determining a first position of the vehicle using a first positioning system operative to determine a first real time position of the vehicle;
   determining a second position of the vehicle using a second positioning system independent of the first positioning system and operative to determine a second real time position of the vehicle;
   determining with a position validation computer an offset between the first position and the second position based on a comparison of the first position of the vehicle and the second position of the vehicle;
   determining if the offset exceeds a threshold offset; and
   if the offset exceeds the threshold offset, providing a notification to indicate a potential error in the position of the vehicle.

2. The method of claim 1, wherein the first positioning system comprises a Global Positioning System (GPS).

3. The method of claim 2, wherein the second positioning system comprises radar mounted on the vehicle and wherein determining the second position of the vehicle using the radar comprises providing a radar image comprising a location of land or an object and the second position of the vehicle at which the radar is mounted.

4. The method of claim 3, wherein determining with a position validation computer the offset between the first position and the second position comprises:
   providing an electronic chart comprising a representation of the land or object and the first position of the vehicle determined using GPS;
   overlaying the radar image on the electronic chart and aligning the location of the land or the object in the radar image with the representation of the land or the object in the electronic chart;
   comparing the first position of the vehicle on the electronic chart positioned according to GPS with the second position of the vehicle on the radar image positioned according to radar; and
   determining the offset as the distance from the first position to the second position.

5. The method of claim 2, wherein the second positioning system comprises an inertial navigation system (INS).

6. The method of claim 2, wherein the second positioning system comprises sonar.

7. The method of claim 2, wherein the second positioning system comprises an automatic identification system (AIS) component operative to receive and interpret transmitted AIS signals or a system operative to triangulate signals associated with a plurality of fixed broadcast signal generators.

8. A computer-implemented method for validating a position of a vehicle, the method comprising:
   determining a first position of an element with respect to a first position of the vehicle via a first positioning system operative to determine a first real time position of the vehicle;
   providing a first representation of the first position of the element and the first position of the vehicle on a first image;
   determining a second position of the element with respect to a second position of the vehicle via a second positioning system operative to determine a second real time position of the vehicle;
   providing a second representation of the second position of the element and the second position of the vehicle on a second image;
   scaling and aligning the first image and the second image such that the first position of the element aligns with the second position of the element;
   determining an offset between the first position of the vehicle and the second position of the vehicle; and
   if the offset exceeds a threshold offset, providing a notification to indicate a potential error in the position of the vehicle.

9. The method of claim 8, wherein the first positioning system comprises a GPS.

10. The method of claim 9, wherein the second positioning system comprises radar or sonar.

11. The method of claim 9, wherein the second positioning system comprises an INS.

12. The method of claim 9, wherein the second positioning system comprises an AIS component operative to receive and interpret transmitted AIS signals.

13. The method of claim 9, wherein the second positioning system comprises a system operative to triangulate signals associated with a plurality of fixed broadcast signal generators.

14. The method of claim 8, wherein the vehicle comprises a ship and wherein the element comprises land or a fixed object.

15. The method of claim 8, wherein the vehicle comprises a first ship, wherein the element comprises a second ship, and wherein the second positioning system comprises an AIS component operative to receive and interpret transmitted AIS signals.

16. The method of claim 8,
wherein the vehicle comprises a ship,
wherein the first positioning system comprises a GPS,
wherein the element comprises land or a fixed object,
wherein the second positioning system comprises radar,
wherein the first representation comprises an electronic chart displaying the first position of the land or fixed object and the first position of the ship according to the GPS, and
wherein the second representation comprises a radar image displaying the second position of the land or fixed object with respect to the vehicle.

17. The method of claim 8, further comprising:
determining a third position of the element with respect to a third position of the vehicle via a third positioning system;
providing a third representation of the third position of the element and the third position of the vehicle; and
scaling and aligning the third representation with the first representation and the second representation such that the first, second, and third positions align,
wherein determining the offset between the first position of the vehicle and the second position of the vehicle further comprises determining the offset between first, second, and third positions of the vehicle.

18. A computer-readable storage medium comprising computer-executable instructions that, when executed by a computer, cause the computer to:
determine a first position of a ship using a GPS;
plot the first position of the ship on an electronic chart;
determine a second position of the ship using a second positioning system independent of the GPS and operative to determine a real time position of the vehicle;
determine an offset between the first position and the second position based on a comparison of the first position and the second position;
determine if the offset exceeds a threshold offset; and
if the offset exceeds the threshold offset, provide a notification to indicate a potential error in the position of the ship.

19. The computer-readable storage medium of claim 18, wherein causing the computer to determine the offset between the first position and the second position comprises causing the computer to:
overlay an image comprising a location of land or an object and the second position of the ship on the electronic chart;
scale and align the location of the land or the object in the image with the representation of the land or the object in the electronic chart;
compare the first position of the ship on the electronic chart positioned according to GPS with the second position of the ship on the image positioned according to the second positioning system; and
determine the offset as the distance from the first position to the second position.

20. The computer-readable storage medium of claim 19, wherein causing the computer to determine the offset between the first position and the second position occurs when a separation distance between the ship and a known geographical location or feature is less than a threshold distance and continues at predetermined intervals until the separation distance exceeds the threshold distance.

* * * * *